Oct. 28, 1958

A. H. DICKINSON 2,858,432

DECADE COUNTER

Filed Dec. 28, 1955

2 Sheets-Sheet 1

INVENTOR.
ARTHUR H. DICKINSON

BY [signature]

ATTORNEY

Oct. 28, 1958 A. H. DICKINSON 2,858,432

DECADE COUNTER

Filed Dec. 28, 1955 2 Sheets-Sheet 2

INVENTOR.
ARTHUR H. DICKINSON

BY [signature]

ATTORNEY 2,858,432

DECADE COUNTER

Arthur H. Dickinson, Greenwich, Conn., assignor to International Business Machines Corporation, New York, N. Y., a corporation of New York Application December 28, 1955, Serial No. 555,811

1 Claim. (Cl. 250—27)

This invention relates to electronic data processing machines and more particularly to registers or storage devices suitable for use in such machines.

The present invention has for its broad object to provide an improved register or storage device.

Another object is to provide a register having fewer digit designating stages.

An object is to provide a register which embodies the advantages of trigger circuits having more than two stable states.

An object is to provide a register which requires fewer electronic tubes with a consequent saving in the cost of wiring and the additional circuit components such as resistors and capacitors.

An object is to provide a register which effects a considerable reduction in heat radiation.

Other objects of the invention will be pointed out in the following description and claim and illustrated in the accompanying drawings, which disclose, by way of example, the principle of the invention and the best mode, which has been contemplated, of applying that principle.

Figures 1, 2:
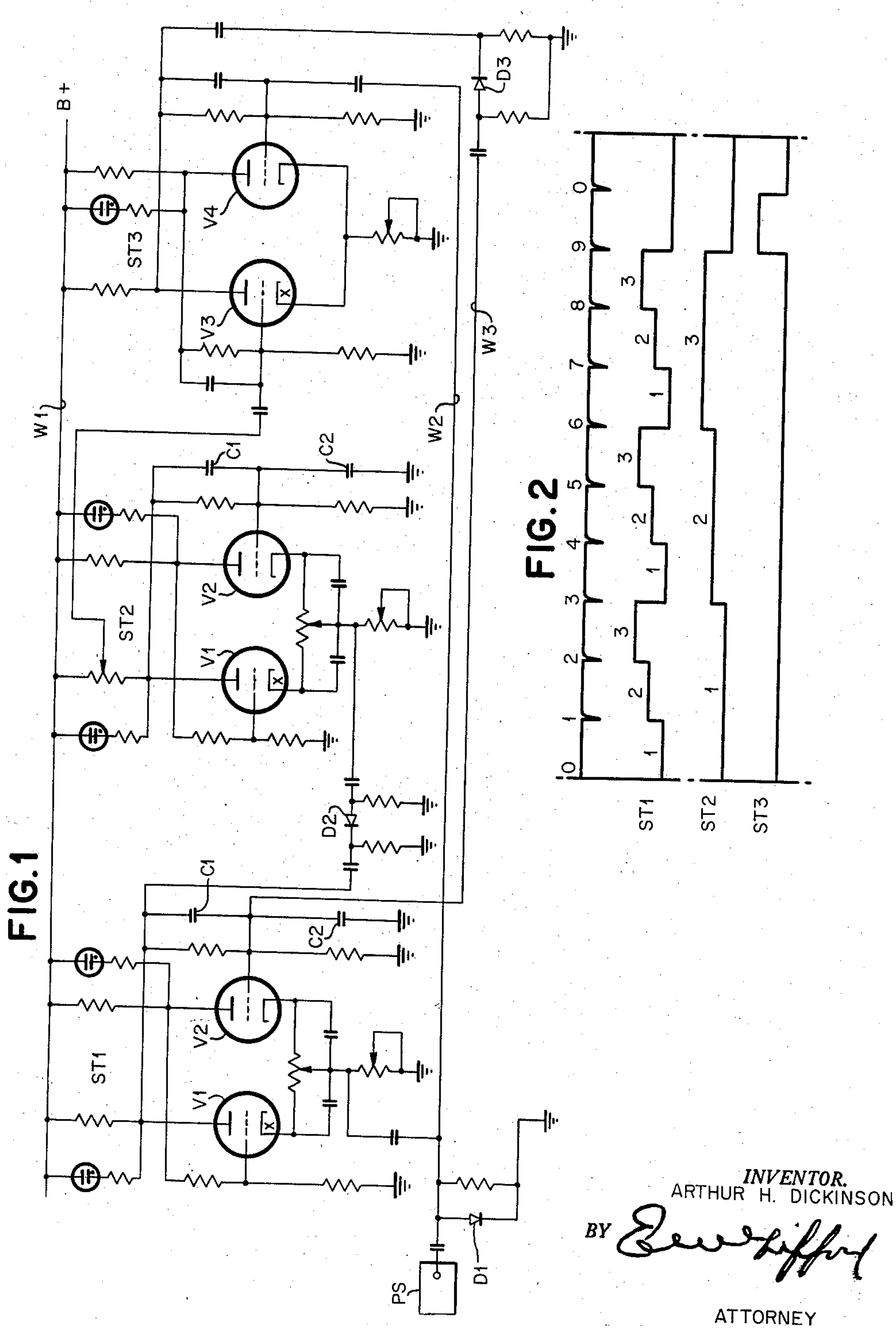
Fig. 1 is a wiring diagram of a single order of a register or storage device employing several trigger circuits having more than two stable states.
Fig. 2 is a diagram showing the progressing of the register through different digit or value representing conditions in accordance with a series of digital triggering pulses.

With reference to Fig. 1 there is shown a single order of a register or storage device which includes two tristable trigger circuits or stages ST1, ST2 of the general type disclosed in application Serial No. 555,859, filed by R. C. Paulsen and A. H. Dickinson on December 28, 1955. It will be understood that the Paulsen and Dickinson trigger circuits have been selected purely for purposes of illustration and that other polystable trigger circuits might be used.

The disclosed register also includes a conventional bistable trigger circuit or stage ST3 of the Eccles-Jordan type which, in combination with the two tristable triggers ST1, ST2, could give the register order a maximum count capacity of 18. The circuit arrangement in Fig. 1 includes a decimal correction circuit which causes the register order to count to 10 only and therefore is what is commonly known as a modified decimal register.

Each of the tristable trigger circuits or stages ST1, ST2 comprises two triodes V1, V2 which are wired somewhat like a conventional Eccles-Jordan trigger circuit except that the cross-coupling condensers which are usual in the Eccles-Jordan circuit have been omitted in the case of the tubes V1, only tubes V2 being provided with the cross-coupling condensers C1, C2. By suitable choice of components and tube characteristics the omission of the cross-coupling condensers causes the tubes V1, V2 and the associated circuit components to operate as a tristable trigger in the manner disclosed in the Paulsen and Dickinson application when input pulses are applied to the cathodes of the tubes V1, V2.

The input pulses are applied from pulse source PS which is coupled to the cathodes of stage ST1 through a suitable diode clipping circuit D1 which has the effect of limiting the input to the cathodes of tubes V1, V2 to negative triggering pulses, each negative pulse causing a change of state. Normally, when the register or storage order is at zero, the tubes V1, V3 will all be conductive to represent the zero state and is indicated in Fig. 1 by the small "*x*" between the grids and cathodes of tubes V1, V3. The tristable trigger circuits or stages ST1, ST2 are cross-coupled through a diode differentiating circuit generally designated D2 which renders the stage ST2 responsive only to negative pulses from stage ST1. Stage ST3 is coupled to stage ST1 through a conventional input condenser so as to be responsive only to negative pulses from the stage ST2.

In Fig. 2 there is shown the transition of the register order from zero through "9" and back to zero in response to ten digital impulses. While the transition from zero back to zero is shown in response to ten pulses, it will be apparent that the actual status of the order after a lesser number of pulses is indicated by the scale of numbers at the top in Fig. 2.

The first pulse applied to the cathodes of tubes V1, V2 causes the stage ST1 to be conductive with respect to both tubes V1, V2 which places the trigger circuit comprising stage ST1 in the second stable state representing "1." The second triggering pulse applied to stage ST1 causes tube V2 to conduct fully and cuts "off" tube V1 placing the trigger circuit in the third stable state which designates "2." In Fig. 2 three different stable states of the tristable triggers are indicated by the small numbers 1, 2, 3 on the three steps which represent "0," "1" and "2," respectively.

When the third pulse is applied, stage ST1 is turned completely "off" (state 1) to represent "0" in which tube V1 is again made fully conductive. This produces a negative pulse on the anode of tube V1 which is communicated through the diode circuit D2 to the cathodes of the tubes V1, V2 for stage ST2 turning this trigger circuit to the second stable state to represent "3."

It now requires another sequence of three negative pulses applied to the stage ST1 to again produce a negative pulse through the diode D2 which will place stage ST2 in the third stable state to represent "6." After another series of three pulses applied to stage ST1, a third negative pulse applied to stage ST2 restores stage ST2 to the first stable state to represent "9." When the ninth pulse restores ST2 to the first stable state as a preliminary to representing "9," a negative pulse is produced on the anode of the tube V1 for stage ST2 which is applied to the grid of tube V3 turning stage ST3 "on."

The tenth pulse applied to stage ST1 tries to place this stage in the second state, but this is prevented in a manner now to be described. The tenth pulse is not only applied to the cathodes of both tubes V1, V2 but additionally is applied to the grid of tube V4 over wire W2 and turns stage ST3 "off." This produces a negative pulse on the anode of tube V3 which is fed back through a second diode differentiating circuit D3 and wire W3 to the grid of tube V2 of stage ST1. This negative pulse locks stage ST1 in the first stable state and counteracts the tendency of the tenth pulse to place stage ST1 in the second stable state.

Figure 3:
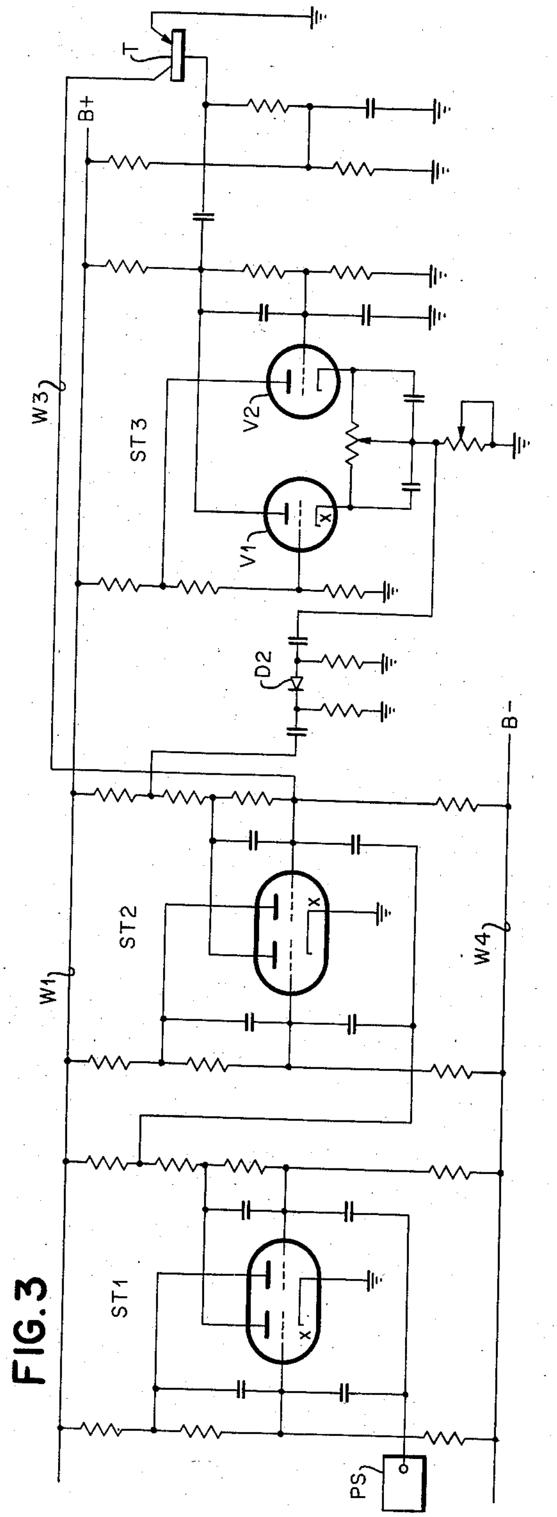
Fig. 3 is a diagram showing a modified form of register or storage device embodying a single trigger circuit having more than two stable states.
Figure 4:
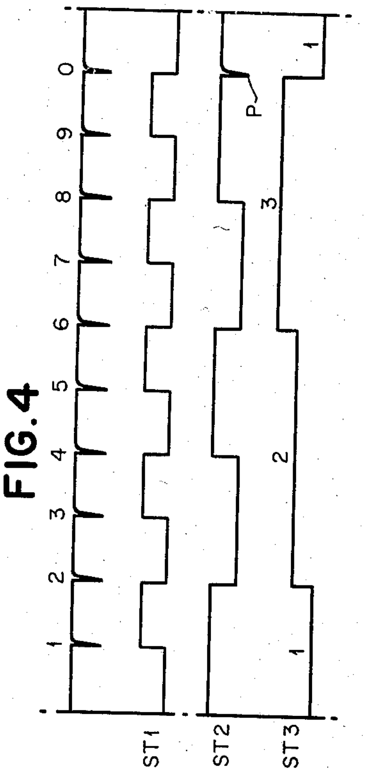
Fig. 4 is a similar diagram to Fig. 2 showing the different digit-representing states assumed by the register in response to a series of digital triggering pulses.

In Fig. 3 there is shown a modified form of the invention in which stages ST1, ST2 comprise conventional Eccles-Jordan type trigger circuits and stage ST3 a tri-stable trigger circuit. Insofar as stages ST1, ST2 are concerned, the register functions like a conventional binary register in progressing from zero to "9" in response to nine pulses. Each time stage ST2 goes "off" a negative pulse is produced which is passed through the diode differentiating circuit D2 to the cathodes of stage ST3. Thus, at the counts of 2, 6 and 10, stage ST3 is carried to the second, third and first stable states, respectively. The tenth pulse turns stage ST1 "off" and stage ST2 is momentarily turned "off," which produces a negative pulse restoring stage ST3 to the first stable state. This produces a negative pulse on the anode of tube V1 of stage ST3 which is momentarily applied to the base of the transistor T the emitter of which is grounded. This causes the transistor T to conduct in the collector circuit which includes wire W3 thereby raising the potential of the right-hand grid of stage ST2 causing this stage to conduct in "on" status. In other words stage ST2 is first turned "off" and then immediately turned back "on" again, thereby accounting for the negative pip P which appears in Fig. 4.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A register comprising three digit representing stages, each stage consisting of a single trigger circuit including a pair of cross-coupled electronic tubes having a single input and a single output, two of said stages each being capable of representing three values by three different stable states of its trigger circuit, and the third representing 9 when conditioned by a pulse from the output of one of the first two stages; means to couple the first two stages to each other and the said one stage to the third stage in cascade between their inputs and outputs; means for deconditioning the third stage when the register as a whole counts to 10, and a feedback coupling from the third stage to the first stage to reset said stage to the zero designating stable state when the register counts to 10.

References Cited in the file of this patent

UNITED STATES PATENTS

| | | |
|---|---|---|
| 2,538,122 | Potter | Jan. 16, 1951 |
| 2,540,442 | Grosdoff | Feb. 6, 1951 |
| 2,558,936 | Dickinson | July 3, 1951 |
| 2,566,918 | Bergfors | Sept. 4, 1951 |
| 2,566,933 | Dickinson | Sept. 4, 1951 |
| 2,584,363 | Mumma | Feb. 5, 1952 |
| 2,594,092 | Taylor | Apr. 22, 1952 |
| 2,620,440 | Baker et al. | Dec. 2, 1952 |
| 2,636,985 | Weissman | Apr. 28, 1953 |
| 2,671,171 | French | Mar. 2, 1954 |
| 2,756,934 | Ziffer | July 31, 1956 |